United States Patent [19]

Underwood et al.

[11] Patent Number: 4,561,480
[45] Date of Patent: Dec. 31, 1985

[54] LEAF CADDY

[76] Inventors: Stephen C. Underwood, 1290 Country Address, Clarkston, Ga. 30021; John T. Mullen, 3 Randolph Dr., Rome, Ga. 30161

[21] Appl. No.: 654,848

[22] Filed: Sep. 26, 1984

Related U.S. Application Data

[63] Continuation of Ser. No. 429,849, Sep. 30, 1982, abandoned.

[51] Int. Cl.[4] .............................................. B65D 67/12
[52] U.S. Cl. ...................................... 150/49; 248/99; 15/257.1; 294/1.1; 150/51
[58] Field of Search .......................... 150/49, 51, 1, 2; 15/257.1, 257.3, 257.6, 257.7; 446/450, 431; 248/99; 294/1 R, 1.1

[56] References Cited

U.S. PATENT DOCUMENTS

| 46,168 | 1/1865 | Wilcox | 150/49 |
|---|---|---|---|
| 314,752 | 3/1885 | Throckmorton | 150/49 |
| 618,442 | 1/1899 | Shearer | 150/49 |
| 938,431 | 10/1909 | Orcutt | 150/49 |
| 1,827,232 | 10/1931 | Henry | 150/49 |
| 3,254,443 | 6/1966 | Olson | 449/450 |
| 3,332,166 | 7/1967 | Alexander | 446/431 |
| 3,837,116 | 9/1974 | Sun | 449/450 |

Primary Examiner—Joseph Man-Fu Moy
Attorney, Agent, or Firm—Steele, Gould & Fried

[57] ABSTRACT

A leaf caddy for holding and transporting lawn debris when in use for storage in a minimum of space when not in use comprising: an upper rim of lightweight, strong, flexible material, the rim comprising a pair of first and second thin, flexible rods, each rod having a first end and a second end and an initial, linear configuration, and connectors joining the ends of the rods, each said connector comprising two connector halves and a hinging member located peripherally outwardly of the rods, the connector halves, the hinging member and the rods being arranged such that when the connector halves being rotated relative to the rods to form a circular configuration, the resilience of the rods locking the hinging member to prevent any rotation, and when the connector halves being rotated relative to the rods to a collapsible condition, the resilience of the flexible rods returning the rods to their initial linear configuration, a fabric bowl connected to the rim.

6 Claims, 6 Drawing Figures

LEAF CADDY

This is a continuation, of application Ser. No. 429,849, filed Sept. 30, 1982, now abandoned.

BACKGROUND OF THE INVENTION

The present invention relates generally to the field of receptacles, and more particularly, is directed to a collapsible receptacle suitable for collecting and transporting leaves.

During the fall and the spring seasons, particularly, property owners have been faced with the problem of disposing of falling leaves, twigs and other debris which have a tendency to accumulate in and about the lawns and gardens of residential properties, both within city limits and within suburban communities. Most homeowners meticulously sweep, rake and otherwise accumulate the leaves, twigs and other debris into piles for transporting and ultimate disposal.

In the past it was the common practice to simply burn the piles of fallen leaves and then dispose of the ashes in a relatively easy manner. However, more recently, most communities have enacted rather strict laws in efforts to prevent air polution and these laws now most often completely ban the previously unrestricted buring procedures. Under the circumstances, property owners now most employ trash containers, plastic bags and other types of containers for carrying the piles of the leaves to a selected area of disposal.

The presently available containers are all relatively small in size and therefore can hold only a limited quantity of leaves at any one time. Also, the presently used leaf containers feature a rather small opening for receipt of the leaves thereby greatly increasing the time and effort required to stuff the leave and other lawn debris into such a container through the small opening. Additionally, especially in the case of plastic trash bags, it has been found that the trash bags will frequently be torn or puncutured by sticks and twigs which may be present in and about the leaves and other debris. Further, the weight of the loaded debris often results in the tearing of the plastic trash bag. Accordingly, the need remains to supply a sturdy, lightweight, easily loaded carrier to remove leaves and other debris from the lawns and gardens of residential and other properties.

SUMMARY OF THE INVENTION

The present invention is directed to a leaf receptacle, and more particularly, is directed to a lightweight, readily transportable and easily loaded leaf caddy or receptacle.

The leaf caddy of the present invention comprises generally a circular top hoop or rim which preferably may be fabricated of ¼ inch diameter extruded fiberglass rods. The fiberglass hoop has proved advantageous for the stated application because of its strength, flexibility, thinness and lightness. Preferably, a pair of similar elongated lengths of fiberglass rod are joined together by suitable cylindrical connectors in end to end juxtaposition to form a circular hoop or rim. A generally hemispherically shaped cloth bowl is secured to hang from the rim. The cloth bowl may advantageously be formed of similarly shaped quadrants which are sewn together and are applied in a manner to depend from the hoop or rim in a sturdy, leaf-carrying configuration. In the preferrred embodiment, the fabric bowl is fabricated of woven cottonjersey cloth because of its flexibility and its general resistence to fire. Additionally, because of the air spaces inherent in the woven cotton fabric, when dropped upon the ground, the bowl rapidly collapses without entrapping any air pockets between the ground and the fabric itself.

In a modified embodiment of the invention, the connectors employed in the hoop or rim to join the ends of the two rods are fabricated in hinge-type configuration to permit collapsing of the rim to a linear configuration when the leaf caddy is to be stored. The modified connectors comprise hinges which are rotatable relative to the rods of the rim whereby the hinge pins may alternately be positioned either outside of the circle defined by the hoop or inside of the circle defined by the hoop. In this manner the rods may easily either be locked in a circular configuration or unlocked to their natural linear configuration, depending upon the rotative position of the hinge connector pins.

It is therefore an object of the present invention to provide an improved leaf caddy of the type set forth.

It is another object of the present invention to provide a novel leaf caddy which comprises generally, a top circular hoop and a semispherical fabric bowl depending from the hoop, whereby the caddy may placed flat upon the ground for leaf loading purposes and may be lifted to form a lightweight sturdy receptacle for carrying the leaves when the caddy is raised.

It is another object of the present invention to provide a novel lightweight leaf caddy which comprises a pair of similar lightweight fiberglass rods a joined in end to end relationship to form a circular rim and a cotton fabric bowel of hemispherical configuration depending from the rim for leaf carrying purposes, the fiberglass rods being connected by similar tubular connectors.

It is another object of the present invention to provide a novel lightweight leaf caddy that is simple in design, lightweight in construction and trouble free when in use.

Other objects and a fuller understanding of the invention will be had by referring to the following description and claims of a preferred embodiment, taken in conjunction with the accompanying drawings, wherein like reference characters refer to similar parts throughout the several views and in which:

DESCRIPTION OF THE PREFERRED EMBODIMENT OF THE INVENTION

Figure 1:
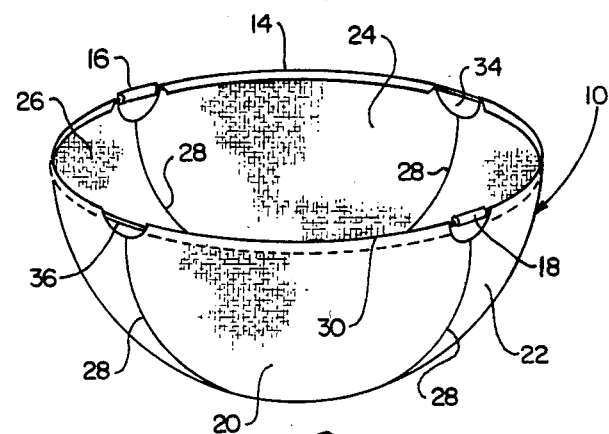
FIG. 1 is a prespective view showing the leaf caddy of the present invention in lifted position suitable for carrying a load.

Although specific terms are used in the following description for the sake of clarity, these terms are intended to refer only to the particular structure of the invention selected for illustration in the drawings, and are not intended to define or limit the scope of the invention.

Figure 2:
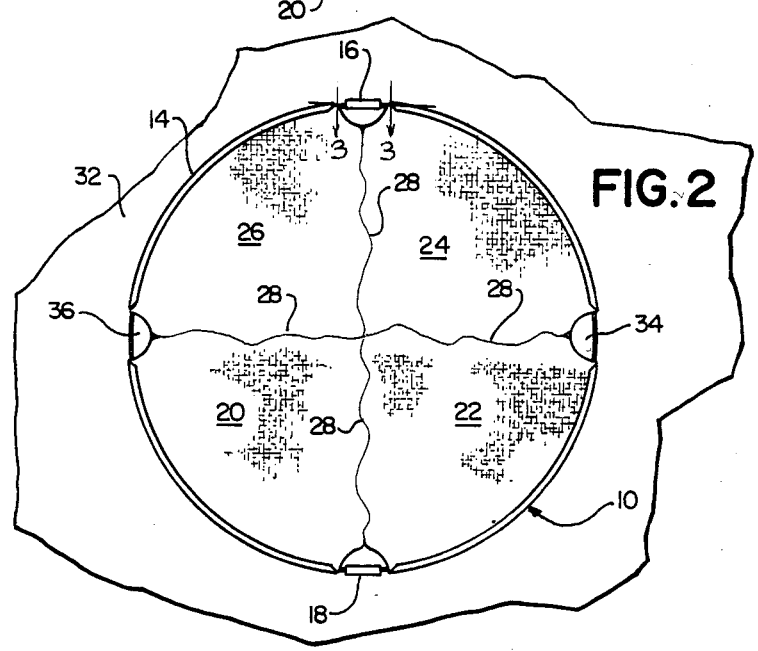
FIG. 2 is a top plan view of a leaf caddy of FIG. 1, lying flat upon the ground prior to loading.

Referring now to the drawings, there is illustrated in FIGS. 1 and 2 a leaf caddy 10 of lightweight, flexible construction suitable to transport leaves, twigs and other lightweight lawn debris. As illustrated in FIG. 1, the caddy 10 is generally semispherical in configuration when lifted to thereby provide a carrying bowl of considerable volume for transporting relatively large quantities of leaves in an easy manner.

Figure 3:
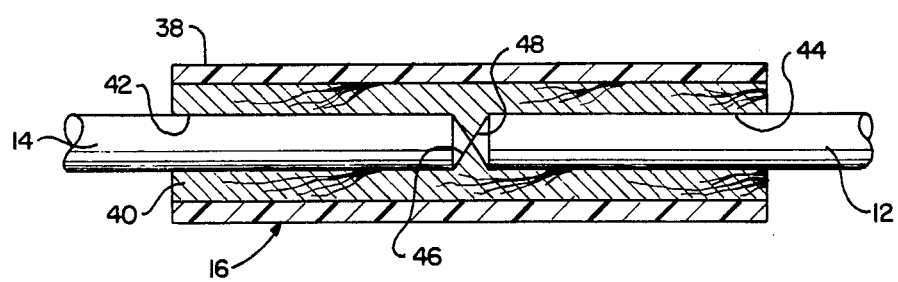
FIG. 3 is an enlarged, cross-sectional view taken along line 3—3 on FIG. 2, looking in the direction of the arrows.

The caddy 10 includes a top circular hoop or rim which comprises a pair of similar, linear, thin, fiberglass rods 12, 14 which are joined in end to end juxtaposition to form the circular top hoop or rim. The respective adjacent ends of the rods 12, 14 can be strongly 3oined by employing a pair of diametrically opposed, cylindrical connectors 16, 18. As best seen in FIG. 3, each connector 16, 18 preferably comprises a central, cylindrical hardwood dowel 40 which is drilled or otherwise provided with opposed, concentric bores 42, 44. The bores 42, 44 terminate inwardly in closed bottom 46, 48 respectively to retain the ends of the hoop rods 12, 14 therewithin.

Preferably, a length of hollow, cylindrical, tubing 38 is glued, pressed or otherwise affixed about the outer periphery of the dowel 40 for strengthening purposes to resist the force imposed by the ends of the rods 12, 14 when the linear rods are bent to the circular configuration illustrated in FIGS. 1 and 2. Optionally, it would be possible to form a closed hoop or rim by employing a single length of thin fiberglass rod of length equal to the two rods 12, 14 illustrated in FIGS. 1 and 2. In such a construction, only a single connector 16 or 18 need be employed as only two rod ends would have to be joined.

A collapsible fabric bowl of semispherical configuration is formed of four similar panels or quadrants 20, 22, 24, 26 of generally triangular configuration. The panels 20, 22, 24, 26 are sewn together in side by side juxtaposition by suitable sewn seams 28 in a known manner to form a closed, bowl-like configuration with an open top. The open top is peripherally folded over the circularly bent rods 12, 14 and then the top is stiched or otherwise secured about the bent rods 12, 14 to maintain the fabric panels 20, 22, 24, 26 in dependingassociation with the top hoop or rim. Preferably, the panel quadrants are cut or otherwise configured at the top to provide medial hand openings 34, 36. In this manner, portions of the hoop rods 12, 14 will be exposed intermediate the connectors 16, 18 to provide a convenient area for grasping the caddy 10 after it is full and ready for transportation and subsequent dumping As illustrated in FIG. 2, in order to load the caddy 10, it is the proper practice to place the caddy flat upon the ground surface 32 whereby the fabic bowl will collapse in generally planer alignment with ground and the hoop rods 12, 14. Because it is undesirable to trap bubbles of air between the fabric panels 20, 22, 24, 26 and the ground surface 22, the panels are preferably fabricated of soft cotton jersey cloth. Such material is extremely soft and flexible and may be considered naturally fire retardent in view of the cotton composition. The cotton is woven into the cloth from which the panels are cut in known manner whereby air readily penetrates through the panels to thereby allow the panels to flatten quickly against the ground when the rim is placed on the ground.

With the leaf caddy in the position illustrated in FIG. 2, it is a relatively easy chore to sweep or rake leaves and other debris directly onto the panels 20, 22, 24, 26, and to form a pile thereon within the boundary defined by the circularly bent hoop rods 12, 14. When sufficient leaves have been piled upon cotton panels, the caddy can then be grasped at the hand openings 34, 36 to thereby grasp diametrically opposed portions of the rods 12, 14 for lifting and carrying purposes. Optionally, it would be possible also to lift and carry the caddy 10 by grasping the diametrically opposed joint connectors 16, 18 in known manner for lifting and carrying purposes.

When storing the leaf caddy 10 after the device has been used, if sufficient room is available, the caddy may be maintained in circular configuration and simply stored in flat condition by collapsing the carrying bowl which comprises the fabric carrying panels 20, 22, 24, 26, Optionally, it would be possible to pull the ends of the hooprods 12, 14 from their associated connector or connectors 16, 18, whereby the natural memory of fiberglass rod material will return the rods to their original linear configuration. In this configuration, the panels of the fabric bowl may be simply wrapped about the pair of rods, 12, 14, thereby greatly reducing storage space requirements.

Figure 4:
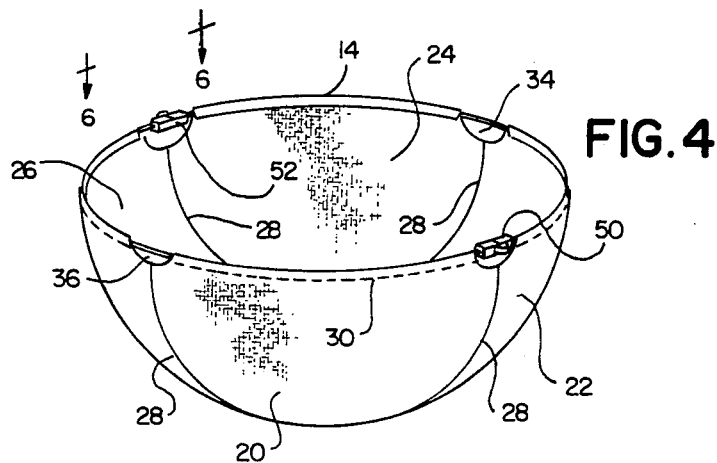
FIG. 4 is perspective view similar to FIG. 1, showing a modified connector construction.
Figure 5:
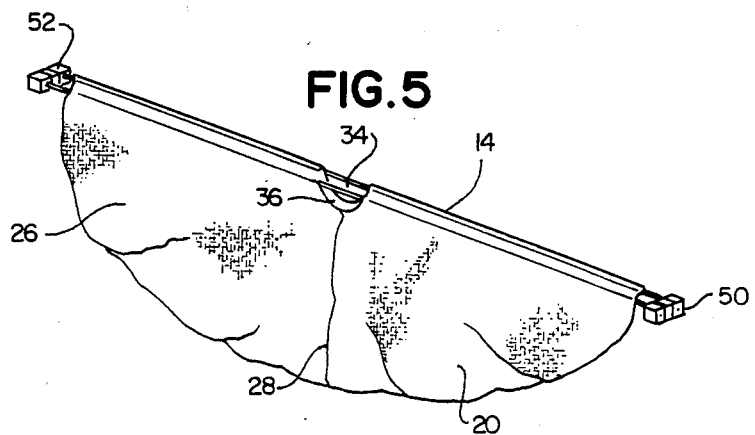
FIG. 5 is a perspective view of the embodiment of FIG. 4, showing the hoop rods in linear relationship and the folded fabric.
Figure 6:
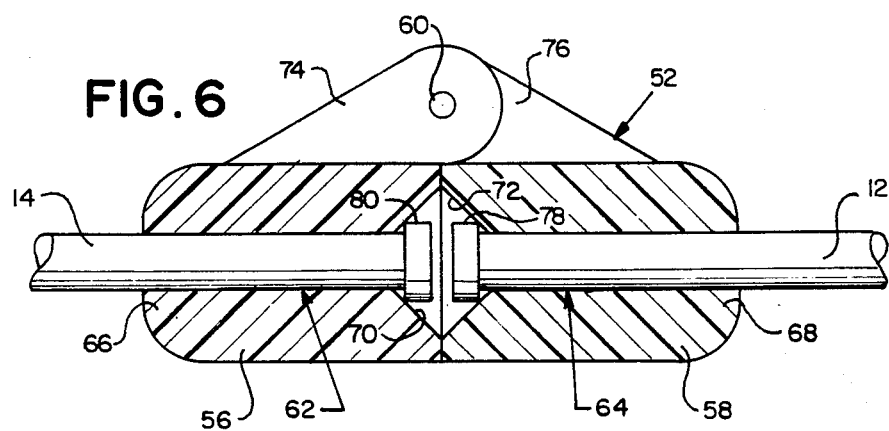
FIG. 6 is an enlarged, cross-sectional view taken along line 6—6 on FIG. 4, looking in the direction of the arrows.

Referring now to FIGS. 4, 5 and 6, a modified caddy construction 10' is illustrated. In the embodiment of FIGS. 4 and 5, a similar pair of thin, strong, linear, fiber glass rods 12 and 14 are utilized and the fabric panels 20, 24, 26 are similarly affixed to rods by stiching with sewn seams 30 about the rods. Suitable hand openings, 34, 36 are provided to facilitate grasping the hoop rods 12, 14 when the modified caddy 10' is fully loaded.

The rods 12, 14 are joined in end to end juxtaposition by employing modified, hinged, connectors 50, 52, which connectors are rotatable relative to the rods 12, 14 to facilitate maintaining the rods in a circular, configuration illustrated in FIG. 4 when the device is to be used and in linear configuration as illustrated in FIG. 5 when the device is to be stored.

As best seen in FIGS. 4 and 6, the hinge connectors 50, 52 are similarly formed of strong molded plastic units to provide a left connector half 56 and a right connector half 58. The connector halves include outwardly extending hinges 74, 76, which hinges permit pivoting of one connector half 56 relative to the other connector half 58 about a pivot pin 60.

The left connector half 56 is provided with a left bore 62 to receive therein one end of a hoop rod 12 or 14. The bore 62 terminates interiorly in a flared terminus 70 to accomodate theres an enlarged keeper 80, which keeper functions to prevent a rod end from pulling out of the bore 62. Similarly, the right connector half 58 is provided with a concentric, longitudinal bore 64 of size to receive therein one end of a hoop or rim rod 12, 14. The right bore 64 terminates inwardly in a flared terminus 72 of suitable size and configuration to receive therewithin a suitable keeper 78, which keeper affixes to the end of the inserted rod 12 or 14 to prevent the rod from pulling out of the bore 64. Each of the left and right concentric bores 62, 64 terminate outwardly in respective left and right locks 66, 68 which are provided for connector locking purposes to the rods when the device is opened to the circular condition illustrated in FIG. 4.

It is noteworthy that the connectors 50, 52 are rotated relative to the rods 12, 14 when it is desired to open the leaf caddy 10' to the circular configuration so that the hinges 74, 76 and the hinge pin 60 are located peripherally outwardly of the hoop rods 12. 14. In this manner, the hooping pressure of the fiber glass material tends to lock the hinges 74, 76 in place and prevent any rotation about the pin 60.

When it is desired to collapse the caddy 10' after use for storage purposes to the folded configuration 54 of FIG. 5, the connectors 50, 52 are rotated about the respective ends of the rods 12, 14 to position the hinges 74, 76 and the hinge pin 60 interiorly of the circle defined by hoop rods 12, 14. I this orientation, the circular hoop will collapse and the natural memory of the fiber glass material which comprises the rods 12, 14 will return the rods to their original linear configuration. The fabric bowl comprising the panels 20, 22, 24, 26 can simply be rolled about the pair of linear rods after the rods are straightened and positioned in side by side juxtaposition in the manner illustrated in FIG. 5.

Although the invention has been described with a certain degree of particularity, it is understood that the present disclosure has been made only by way of example and that numerous changes in the details of construction and the arrangement of parts may be resorted to without departing from the spirit and scope of the present invention.

What is claimed is:

1. A leaf caddy for holding and transporting lawn debris when in use for storage in a minimum of space when not in use comprising: an upper rim of lightweight, strong, flexible material, said rim comprising a pair of first and second thin, flexible rods, each rod having a first end and a second end and an initial, linear configuration, and connectors joining the ends of the rods, each said connector comprising two connector halves and a hinging means located peripherally outwardly of the said rods, said connector halves, said hinging means, and said rods being arranged such that when the connector halves being rotated relative to said rods to form a circular configuration, the resilience of said rods locking the hinging means to prevent any rotation, and when the connector halves being rotated relative to the rods to a collapsible condition, the resilience of said flexible rods returning the rods to their initial linear configuration, a fabric bowl connected to the rim.

2. The leaf caddy of claim 1 wherein a pair of openings are formed in the bowl material at its interconnection with the hoop, the said openings being diametrically opposed and being so positioned that diametrically opposed portions of the hoop are exposed in the openings for caddy carrying purposes.

3. The leaf caddy of claim 1 wherein the flexible material is fiberglass.

4. The leaf caddy of claim 1 wherein the fabric is woven cotton.

5. The leaf caddy of claim 1 wherein the bowl is formed of a plurality of similar panels.

6. The method of loading and transporting a quantity of lawn debris comprising the steps of placing a leaf caddy of the type comprising: an upper rim of lightweight, strong, flexible material, said rim comprising a pair of first and second thin, flexible rods, each rod having a first end and a second end and an initial, linear configuration, and connectors joining the ends of the rods, each said connector comprising two connector halves and a hinging means located peripherally outwardly of the said rods, said connector halves, being arranged such that when the connector halves being rotated relative to the rods to form a circular configuration, the resilience of said rods locking the hinging means to prevent any rotation, and when the connector halves being rotated relative to the rods to a collapsible condition, the resilience of said flexible rods returning the rods to their initial linear confiuguration, a fabric bowl with semispherical shape connected to the rim, upon the lawn and arranging the rim and fabric in generally planar arrangement; loading a quantity of debris upon the fabric bowl within the boundaries defined by the rim while the flexible rim and the fabric bowl are arranged in generally planar arrangement; lifting the rim and causing the fabric to assume a generally semispherical shape while maintaining the debris upon the fabric bowl; and transporting the leaf caddy with the debris to a selected location for disposal of the debris.

* * * * *